No. 734,867. PATENTED JULY 28, 1903.
T. H. HICKS.
AMALGAMATOR.
APPLICATION FILED MAY 1, 1901.
NO MODEL. 2 SHEETS—SHEET 1.

WITNESSES: Thomas H Hicks INVENTOR

BY

ATTORNEY

No. 734,867. PATENTED JULY 28, 1903.
T. H. HICKS.
AMALGAMATOR.
APPLICATION FILED MAY 1, 1901.
NO MODEL. 2 SHEETS—SHEET 2.

No. 734,867. Patented July 28, 1903.

UNITED STATES PATENT OFFICE.

THOMAS H. HICKS, OF FORT WAYNE, INDIANA, ASSIGNOR TO THE HICKS GOLD AND SILVER EXTRACTION COMPANY, A CORPORATION OF GEORGIA.

AMALGAMATOR.

SPECIFICATION forming part of Letters Patent No. 734,867, dated July 28, 1903.

Application filed May 1, 1901. Serial No. 58,344. (No model.)

*To all whom it may concern:*

Be it known that I, THOMAS H. HICKS, a subject of the King of Great Britain, residing at Fort Wayne, county of Allen, and State of Indiana, have invented certain new and useful Improvements in Amalgamators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in amalgamators for extracting amalgamable metals from their ores; and the objects of my improvement are, first, to afford an amalgamator having two rotative cylinders, one within the other, and so mounted that a continuous flow of ore-pulp may be acted upon between the cylinders without coming into contact with the bearings or bearing-surfaces of the cylinders; second, to afford means to limit the range of lateral sway of the inner cylinder, and, third, to afford an amalgamating-cylinder rotative within another and having a greater circumferential surface unit of travel relative to the other.

I accomplish my objects by the construction illustrated in the accompanying drawings, in which—

Figure 1:
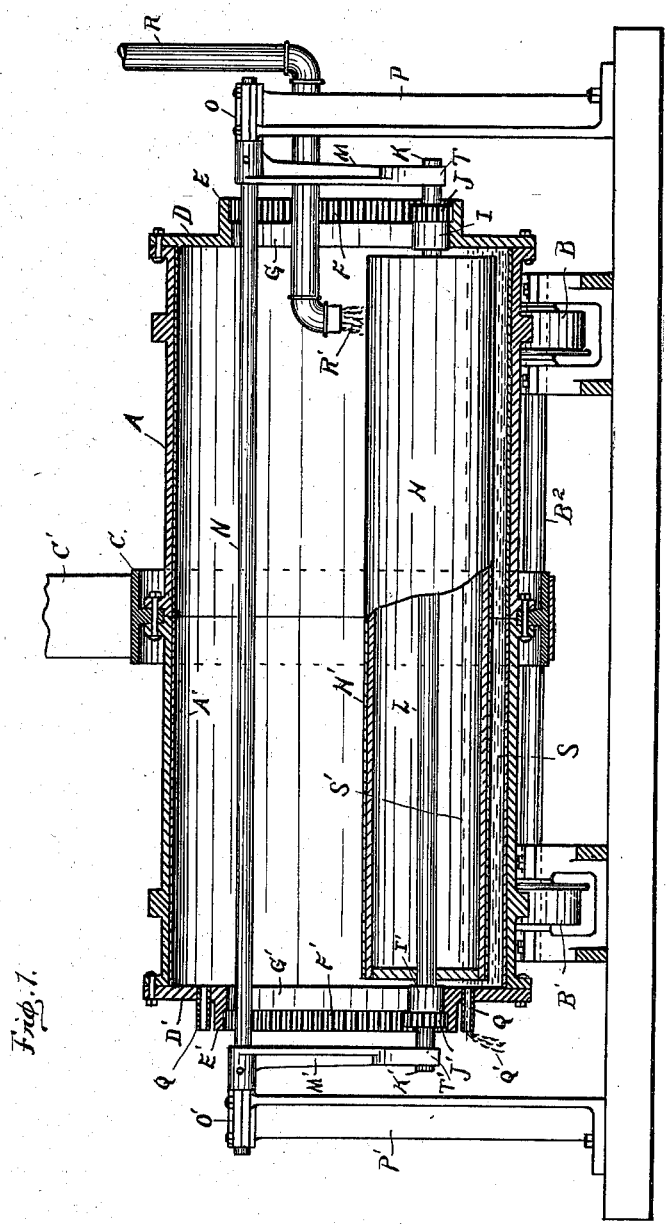
Figure 2:
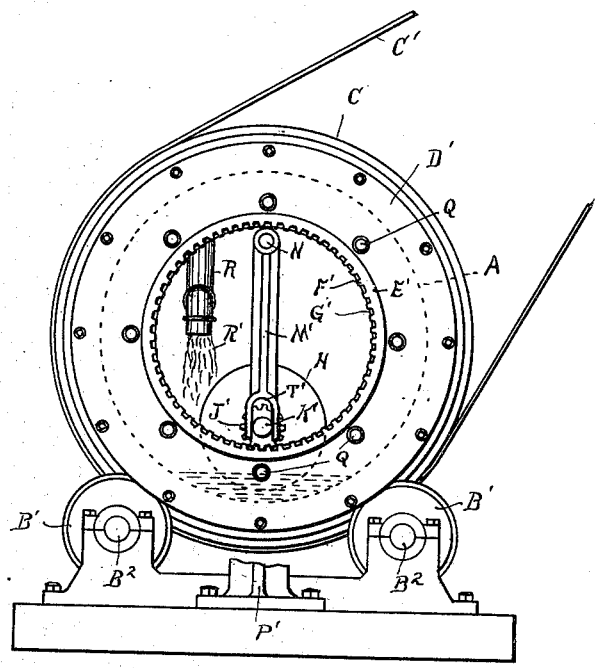

Figure 1 is a vertical section, the roller being shown partly in elevation and partly in central section; and Fig. 2 is an end view.

Similar letters of reference indicate corresponding parts in both views.

Referring now to the drawings, A is the outer cylinder.

B and B' are the bearing-wheels, upon which the said outer cylinder is rotatively mounted.

C is a pulley-flange secured about the middle of the cylinder A, upon which is trained a driving-belt C'. Upon the ends of the cylinder A are secured the open heads D and D', which have outwardly-extending annular flanges E and E', respectively. The said heads close that portion of the cylinder ends which ranges radially outward from said flanges. Smooth bearing-surfaces G and G' and toothed racks F and F' range parallel and around the inner sides of the flanges E and E'. Discharge-spouts Q extend through the head D' at points external of the flange E' and are open throughout.

H is the inner cylinder, mounted rigidly upon the shaft L. This cylinder is of such diameter as to range within the lower portion of the cylinder A and is mounted so as not to come into contact with the inner surface of the outer cylinder A and is of such length as to extend between the heads D and D' without impinging. The shaft L extends through the heads D and D' and beyond the flanges E and E'. Rollers I and I' and pinions J and J' are rigidly fixed upon the extending portions of the shaft L in line with the inner sides of the flanges E and E'. The said rollers are adapted to travel upon the smooth bearing-surfaces G and G', and said pinions are adapted to mesh with the racks F and F', respectively, and to be driven thereby.

The inner surface of the outer cylinder A and the outer surface of the inner cylinder H are covered by sheetings of copper A' and H', respectively, and are further suitably coated with mercury.

An oscillating shaft N ranges longitudinally through and extends from the ends of the cylinder A at a point above its axis. The ends of said shaft rest in bearings O and O' upon the standards P and P'. Pendants M and M' are rigidly fixed upon the shaft N and have bifurcated lower ends T and T', which range astride the extending ends K and K' of the shaft L. The scope of said bifurcated ends is such as to allow a limited vertical movement of the ends of said shaft.

R is a pipe which extends through the head D and discharges into the fore end of the cylinder A and may lead from any suitable source of supply.

In the operation of my machine the cylinder A is continuously revolved by any suitable source of power, and the cylinder H, by reason of gravitation, tends to remain in its lowermost position, and consequently revolves with the rollers I and I' and pinions J and J', which roll upon the inner surfaces of the revolving flanges E and E' accordingly.

The relative diameters of the racks F and F' and pinions J and J' being respectively the same both ends of the shaft L are consequently driven alike, and the alinement of the cylinders A and H is thereby maintained. Should the cylinder H be lifted so as to disengage said pinions from said racks, it is held in alinement by the connections with the pendants M and M', which, being movable, together with the shaft N, retain the shaft L in a plane parallel therewith and allow the cylinder H to sway laterally in an arc having a radius with the cylinder A. As the cylinder H sways the pendants M and M' swing accordingly. The radius of the arc in which the bifurcated ends T and T' move is greater than that in which said cylinder sways, and consequently the ends of the shaft L rise in said bifurcated ends, according to the distance said cylinder is moved from its normal or lowermost position. The extent of the lateral sway of the cylinder H is limited when the ends of the shaft L rise to the tops of the bifurcated ends T and T' of said pendants, in which instance the pinions J and J' and rollers I and I', mounted upon said shaft, become impinged upon the racks F and F' and bearing-surfaces G and G' of the flanges E and E', respectively. This, however, does not prevent the shaft L from being driven as before, but, instead, holds said pinions into engagement with said racks and insures rotation of the cylinder H, which is essential to the high efficiency of the machine when the ore chances to become congested between the cylinders A and H. Mercury is placed in the bottom of the outer cylinder A to replenish the amalgamated surfaces of both cylinders. By the arrangement of the bearings of the inner cylinder upon the flanges of the outer cylinder the space S, which contains the mercury, extends throughout the length of the two amalgamating-surfaces and insures free lateral circulation of the ore-pulp and more efficient amalgamation. When the machine is in motion, ore-pulp R', composed of a suitable mixture of ore and water, is fed through the pipe R into the fore end of the cylinder A, in which it rises to about the height indicated at S', and is discharged through the lowermost of the pipes Q, as indicated at Q'. In passing from the fore ends of the cylinders to said spouts the ore is acted upon by the constantly-rotating and swaying action of the amalgamating-surface of the inner cylinder and the continuously-moving amalgamating-surface of the outer cylinder.

The greater circumferential surface speed of the inner cylinder relative to that of the outer cylinder, together with the swaying motion of the inner cylinder, acts upon the ore in a particularly desirable manner, and it is this condition which is the spirit of my invention rather than the particular construction.

Having described my invention, what I claim as new, and desire to secure by Letters Patent, is—

1. In combination, a rotative cylinder A having an open head at each of its ends; an annular flange extending from each of said heads; a smooth bearing-surface and a rack parallel therewith arranged on each of said flanges; a cylinder H having a roller and pinion projecting from each of its ends, said rollers and pinions engaging respectively with said bearing-surfaces and racks and being adapted to roll thereon.

2. In an amalgamator, a rotative amalgamating-cylinder A adapted to contain ore and water, and having an open head at each of its ends; an annular flange extending from each of said heads; a cylinder H having bearings supported upon said flanges; and discharge-spouts extending through one of said heads external of its flange.

3. In an amalgamator, a rotative amalgamating-cylinder A adapted to contain ore and water, and having an open head at each of its ends; an annular flange extending from each of said heads; a cylinder H having bearings supported upon said flanges; discharge-spouts extending through one of said heads external of its flange; and pendants mounted independent of the cylinder A and engaging the ends of the shaft of the cylinder H.

In testimony whereof I affix my signature in presence of two witnesses.

THOMAS H. HICKS.

Witnesses:
WILMER LEONARD,
WALTER G. BURNS.